March 27, 1945.  F. A. MILLER  2,372,219
REAMER
Filed Dec. 7, 1942  2 Sheets-Sheet 2
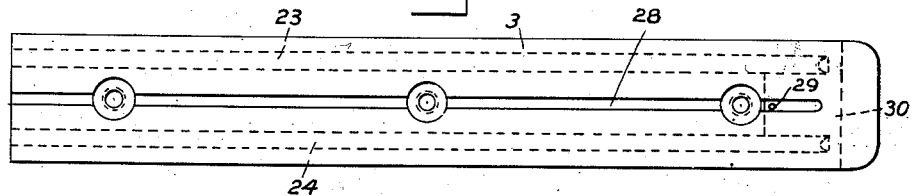
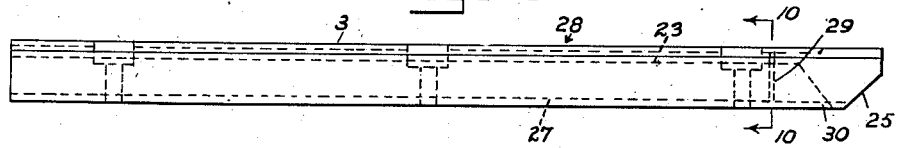
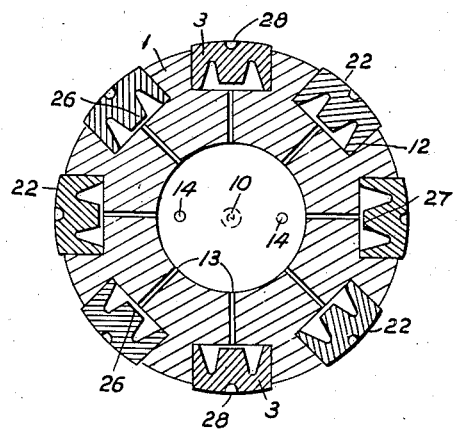
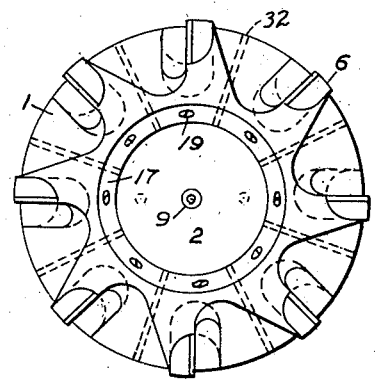
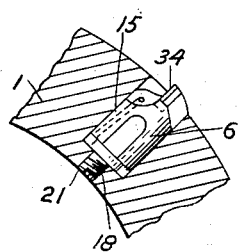
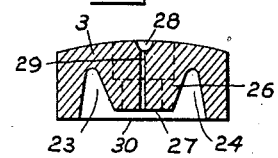
Inventor
Frank A. Miller
By G. J. Kessenich + W. E. Thibodeau
Attorneys Patented Mar. 27, 1945

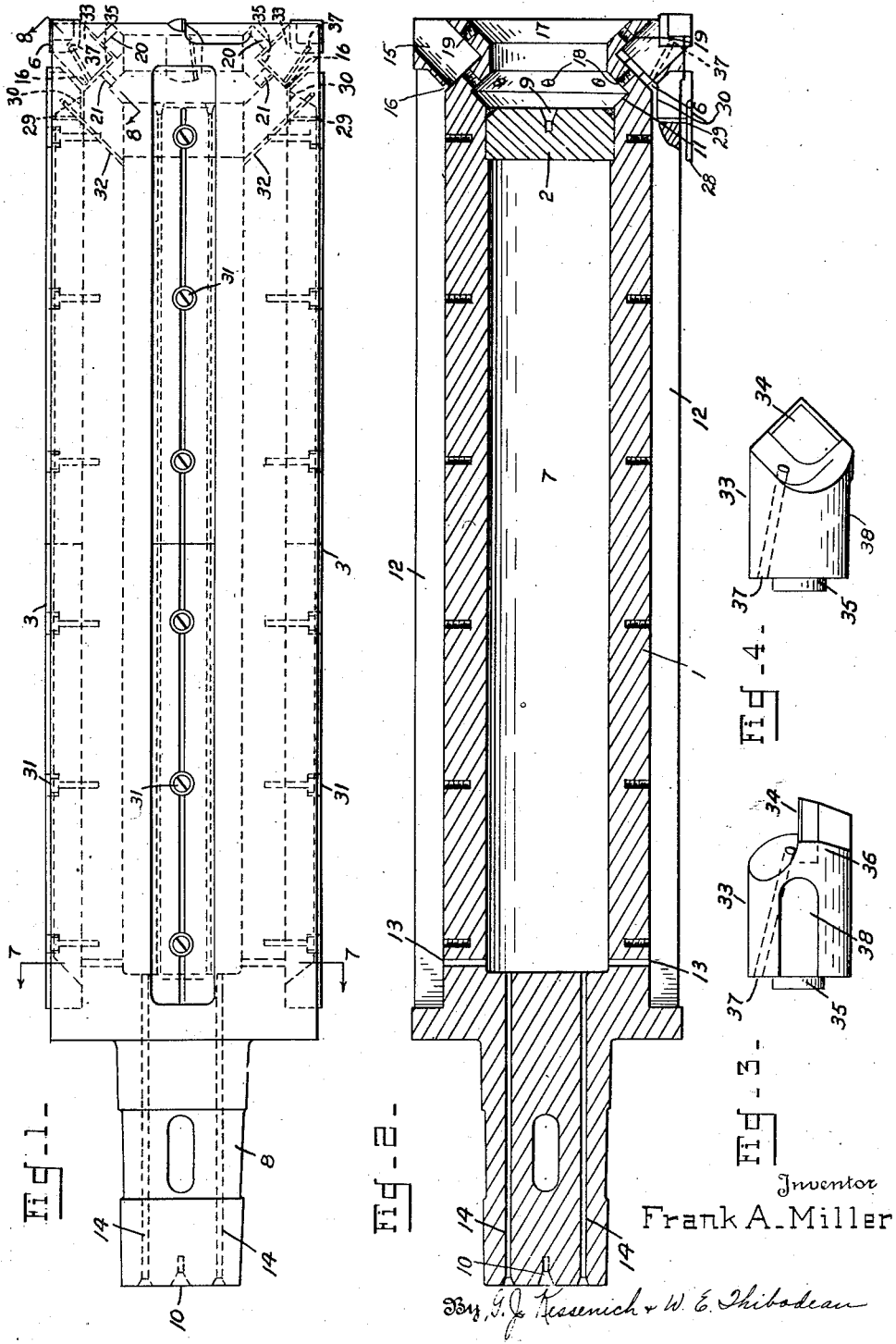

2,372,219

UNITED STATES PATENT OFFICE 2,372,219

REAMER

Frank A. Miller, Troy, N. Y.

Application December 7, 1942, Serial No. 468,115

3 Claims. (Cl. 77—72)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to a multiple cutter reamer, coolant cooled and lubricated, for reaming large bores and more particularly for reaming gun bores of large caliber.

An object of this invention is to provide a reamer having long bearing guide members which are readily adjustable for wear and coolant cooled and lubricated.

Another object of this invention is to provide a reamer having multiple cutters adjustable for grinding and wear.

Still another object of this invention is to provide a reamer that is cooled and lubricated to control expansion of the guide members to eliminate vibration which would otherwise be detrimental to cemented carbide cutters.

The specific nature of the invention as well as other objects and advantages thereof will clearly appear from a description of a preferred embodiment as shown in the accompanying drawings in which:

Fig. 1 is a side elevational view of the reamer embodying this invention.

Fig. 2 is a longitudinal sectional view of the reamer shown in Fig. 1.

Fig. 3 is a side elevational view of the cutting tool with cemented carbide tipped cutting edge shown edgewise.

Fig. 4 is a view similar to Fig. 3 but with the cutting tool turned to show the face of the carbide tipped cutting edge.

Fig. 5 is a top elevational view of the guide member.

Fig. 6 is a side elevational view of the guide member.

Fig. 7 is a cross-sectional view of Fig. 1 taken along the plane 7—7.

Fig. 8 is an enlarged partial sectional view on the line 8—8 of Fig. 1 of the reamer showing the carbide tipped cutting tool positioned for reaming.

Fig. 9 is a right end elevational view of the reamer as viewed in Fig. 1.

Fig. 10 is a cross-sectional view of the guide member taken along plane 10—10 of Fig. 6.

In Figs. 1 and 2, there is shown a reamer embodying this invention comprising a reamer body 1, removable bearing guide members 3 and cutters 6. A reamer body 1, preferably of cast steel, is a long cylindrical member provided with a large cored axial hole 7. On one end of the body 1 there is provided an integral rearwardly projecting shank 8. The shank 8 is provided to mount the reamer to a suitable operating mechanism (not shown).

The forwardly facing end of the hole 7 is counterbored very slightly for a short distance to receive a plug 2. The plug 2 is suitably secured within the hole 7 as by welding. On the forwardly facing side of the plug 2 there is centrally provided a countersunk hole 9 for mounting the reamer on lathe or grinding centers. A similar hole 10 is centrally provided at the end of shank 8.

Immediately adjacent to plug 2 an annular groove 11 is provided within the body 1 about the inner periphery of the hole 7. About the outer periphery of the body 1 there are provided equally spaced rectangular grooves 12 which extend nearly the entire length of the body 1. At the forward ends of the grooves 12 the base of the grooves forms a single saw tooth configuration.

Two oil holes 14 passing through the shank 8 into the cored hole 7 are provided to permit a lubricant to flow from a suitable source (not shown) into the hole 7. Near the rear of the cored hole 7 radial holes 13 are provided which extend from the bottom of each recess 12 into the hole 7. These holes are provided to permit the lubricant to flow outwardly from the hole 7 into the recesses 12. On the outer edge of the forwardly facing end of body 1 there are provided holes 15 bored obliquely inwardly to receive the cutters 6, which will be presently described. A small hole 16 is provided at the bottom of each hole 15 extending into the recesses 12 for the purpose of lubricating the cutters. The interior corner of the forwardly facing end of hole 7 is provided with a chamfered surface 17. Small threaded axial holes 18 are provided at the bottom of each hole 15 and pass into the annular groove 11. Similar threaded holes 19 are provided along the chamfered surface 17 each of which pass into a respective hole 15 approximately in the center thereof. Set screws 20 and 21 are inserted in the holes 19 and 18 respectively.

In the recesses 12 there are inserted bearing guide members 3. The guides 3 are preferably cast of babbitt or other anti-friction material and are long, narrow, rectangular members provided with an arcuate outer surface 22 concentric with respect to the periphery of the body 1 and are of such shape as to conform to the recess 12. On the underside of each guide 3 there are provided two parallel inverted U-shaped channels 23 and 24 which extend from the rear end of each guide to within a short distance of the forwardly facing end. A beveled corner 25 is provided on the underside of each guide member corresponding to the similarly shaped corner of the forwardly facing end of each recess 12. The portion 26 on the underside of each guide 3 defined by the channels 23 and 24 is undercut slightly on the bottom surface 27 to provide a passage to admit the lubricant from the holes 14 in the body 1 into the channels 23 and 24 for cooling purposes. There is provided in the center of each guide 3 on the arcuate surface 22 a long, shallow semi-cylindrical groove 28 of the same length as the channels 23 and 24. A small transverse hole 29 connects the groove 28 to the oil passage provided on the underside of the guide 3 to allow the oil to flow to the outer surface of the guides 3 for lubrication. On the underside of the forwardly projecting end of each guide 3 there is provided a shallow groove 30 which extends from the end inwardly to the lubricating channel for lubrication of the cutter 6 to be described. Each guide 3 is secured to the body 1 by screws 31 which are inserted in suitably counterbored and threaded holes in the guide 3 and suitably threaded holes in the body 1. The threaded holes in the body 1 however do not extend through into the cored hole 7. A plurality of peripherally spaced holes 32 are provided about the periphery of body 1 near the forward end thereof. Such holes obliquely communicate with hole 7 and pass between each recess 12 as shown in Figs. 1 and 9. Holes 32 provide additional passage for lubricating oil from hole 7 to the outer surface of the reamer.

The cutters 6 comprise a short cylindrical body 33 and a cemented carbide cutting edge 34. In the center of the base of the cylindrical body 33 of each cutter 6 there is provided a small, cylindrical, rearwardly projecting boss 35. On the forward end of each cutter an upwardly projecting portion 36 is provided to which there is brazed a carbide cutter 34. A hole 37 is provided in the cylindrical portion 33 of the cutters 6 to permit oil to flow to the cutting edge 34 of the cutter. The hole 37 is drilled obliquely from approximately the center of the top of the forward end of the cutter to the bottom of the body 33. The boss 35 forms an annular recess about the bottom of the cutter 6 when the cutter 6 is inserted in the hole 15. The lubricating oil then enters this recess and is forced upwardly to the cutting tip 34 through the hole 37. On the exterior surface of the cylindrical body 33 a flat milled surface 38 is provided to form a suitable locating and locking surface for each cutter. Each cutter 6 is secured within the holes 15 by set screw 20 which bears against the surface 38. The set screw 21 at the bottom of hole 15 is provided for adjustment of the cutter 6 to compensate for wear or redressing of the cutting tip.

The reamer is readily mounted in a lathe or grinder for redressing the guide members or sharpening the cutters by placing the reamer on the centers of either machine, using the countersunk centering holes 10 and 9. As the guide members 3 are readily removable, compensation for wear and redressing of the guides can be provided by shims underneath each guide member 3. Such shims may be of any suitable heavy paper. This procedure may be repeated many times before the guides 3 are worn to such an extent as to require replacement. The set screw 21 is provided to advance the cutter outwardly to compensate for wear and for redressing of the carbide cutting edge 34.

The metallic guide members 3 conduct rapidly away from the bearing surfaces of the guide members the heat caused by friction between the bore and the guide members. To conduct the heat thus generated away from the guide members lubricating oil is passed under each guide member in the channels previously described. In this manner the temperature of the guide members is maintained constant and consequently the expansion of these members is well controlled. Thus as the expansion of the guide members is maintained relatively constant there is practically no vibration which would otherwise be highly detrimental to the cemented carbide tipped cutters. The long bearing guide members also serve to steady the reamer body as it progresses through the bore of the barrel.

I claim:

1. In a large bore reamer having a cylindrical body portion and a plurality of cutters mounted in the forward end of said body portion, a plurality of longitudinal grooves equally disposed around the periphery of the body portion, bearing members mounted in said grooves, a plurality of projections on the underside of said bearing members defining a fluid passage in good heat conducting relation to the bearing members, and means arranged to supply lubricating fluid to each said fluid passage whereby said bearing members are cooled by the lubricating fluid.

2. In a large bore reamer having a body portion provided with a longitudinal bore, an annular groove provided about the inner periphery of the bore adjacent its entering end, a plurality of spaced cylindrical recesses in the entering end of said body portion, said recesses being non-radially inclined and in communication with said groove by threaded passageways, the entering end of said bore being provided with a chamfered surface and said recesses being likewise in communication with said chamfered surface by threaded passageways, cutters mounted in said recesses, set screws in the first-named passageways for adjusting the depth of insertion of the cutters in the recesses, and set-screws in the last-named passageways for securing the cutters therein.

3. In a large bore reamer having a cylindrical body portion and a plurality of cutters mounted in recesses provided in the forward end of said body portion, a plurality of longitudinal grooves equally disposed around the periphery of the body portion, bearing members mounted in said grooves, a plurality of projections on the underside of said bearing members defining a fluid passageway in good heat conducting relation to the bearing members, means arranged to supply lubricating fluid to each of said fluid passageways whereby said bearing members are cooled by the lubricating fluid, and an opening connecting said fluid passageways with the said recesses of the body portion whereby the said cutters may also be lubricated.

FRANK A. MILLER.